United States Patent [19]

Berkling et al.

[11] 4,024,507
[45] May 17, 1977

[54] ARRANGEMENT FOR MONITORING THE STATE OF MEMORY SEGMENTS

[75] Inventors: Klaus Berkling, St. Augustin; Werner Kluge, Bensberg-Refrath, both of Germany

[73] Assignee: Gesellschaft fur Mathematik und Datenverarbeitung mbH, Bonn, St. Augustin, Germany

[22] Filed: Apr. 14, 1975

[21] Appl. No.: 568,129

[30] Foreign Application Priority Data

Apr. 13, 1974 Germany ............................ 2418034

[52] U.S. Cl. ................................................ 340/172.5
[51] Int. Cl.² ........................................... G06F 11/00
[58] Field of Search ..................... 340/172.5; 445/1

[56] References Cited

UNITED STATES PATENTS

| | | | |
|---|---|---|---|
| 3,670,309 | 6/1972 | Amdahl et al. | 340/172.5 |
| 3,680,055 | 7/1972 | Wilson et al. | 340/172.5 |
| 3,810,109 | 5/1974 | Morris et al. | 340/172.5 |
| 3,878,513 | 4/1975 | Werner | 340/172.5 |

*Primary Examiner*—Mark E. Nusbaum
*Attorney, Agent, or Firm*—Spencer & Kaye

[57] ABSTRACT

In a system for monitoring groups of memory locations in the working memory of a computer equipped with a central processing unit, each location having a capacity of n binary bits, in order to effect automatic location of a group of successive empty locations, which group has a length L at least equal to that required by an interrogating program, and to return a group of memory locations whose contents are no longer required to an unoccupied state and combine such group with following unoccupied groups, there are provided: a memory state register and a base address status register each having a plurality of stages, with each stage corresponding to a respective working memory location and being in one binary state when its corresponding memory location is occupied and in the opposite binary state when its corresponding memory location is empty; an arithmetic-clogic function unit including an adder circuit and an indicator circuit connected to the registers for locating a group of successive empty working memory locations by determining the binary states of blocks of adjacent stages of each of the registers; a first group of status flip-flops divided into two blocks, a first one of the blocks being connected to be interrogated by the central processing unit; and a control mechanism connected to the registers, the function unit and the status flip-flops and arranged to interrogate the second one of the blocks of flip-flops, the mechanism being arranged to selectively process the contents of the registers according to one of a selected plurality of modes or to go through a waiting loop in dependence of the states of the flip-flops, and to emit control signals determining the mode according to which the contents of the registers are to be processed.

7 Claims, 5 Drawing Figures

ARRANGEMENT FOR MONITORING THE STATE OF MEMORY SEGMENTS

BACKGROUND OF THE INVENTION

The present invention relates to a circuit arrangement for monitoring the state of memory locations in working memories of computers, i.e., for the automatic location of an unoccupied group of memory locations in a working memory whose group length L has at leat the value $L_0$, which is required by an interrogating program as well as for the return of a no longer occupied group of memory locations and its linking with subsequent unoccupied memory location groups.

In known computer systems the monitoring of the state of the working memory is based on a linear list which is stored in the working memory itself. The elements of this list substantially include the length L, i.e., number of locations of unoccupied memory location groups, and an indicator A which marks the lowermost address of the respective group. The contents of this list are monitored by subprograms in the operating system in that groups of a predetermined length are transferred to programs or no longer required memory groups are incorporated again in the list of available groups.

A significant drawback of this known process is that respective subprograms not only must search through lists but must perform time-consuming address calculations with each step; furthermore, valuable processor time is consumed during the prologue and epilogue for each subprogram address.

SUMMARY OF THE INVENTION

It is an object of the present invention to substantially relieve the central unit of the computer of operations which are required for monitoring a working memory and to thus additionally make available expensive computer time for user programs.

This and other objects according to the present invention are accomplished by an arrangement including: two separate 1-bit direct access memories, constituting a memory state register and a base address status register, respectively, containing data values relating to the occupied-unoccupied state of memory locations of the working memory; an arithmetic-logic unit including an adder circuit and an indicator circuit connected for enabling and carrying out an algorithm for the location of sequences of unoccupied memory locations, i.e. a string search algorithm, particularly for the addressing of blocks in the memory state register and the base address status register; a control mechanism arranged to run through one of the modes SEARCH, ERASE, ERBAS for processing the contents of the memory state register and the base address status register, or through a waiting loop in dependence on the states of two blocks in a first group of status flip-flops, one of the blocks being interrogated by the central unit and the other block by the control mechanism, the control mechanism discharging, via a second group of status flip-flops, the actuation of the memory state register and of the base address status register required for a certain mode.

The adder circuit substantially includes a logic adding mechanism, a group of general registers whose outputs can be connected to a first one of two inputs of the adding mechanism and whose inputs can receive data from a buffer register via a data collection line; an adder buffer register connected in series to the adder mechanism; and a memory address register containing an actual address l whose contents are fed in direct feedback to a second input of the adder mechanism.

The indicator circuit substantially includes a forward-backward shift register with an indicator in the form of an exclusive-OR circuit, operating as follows:

$$SPR_k = SPR(i) = \begin{cases} 1 \text{ for } k = i \\ 0 \text{ for } k \neq i, \end{cases}$$

a "don't care" logic for the blockwise addressing of successive bits in the memory state register (MEM) and in the base address status register (BAS) and a comparator which is connected in series with the shift register via a data collection bus, as well as a register in which a bit $g$ is stored for separating two groups of memory locations in that the location where the upper address differs from the lower limit address in the highest order bit is marked by a logic 1, and an addressing logic which feeds the signal patterns obtained from the exclusive-OR circuit and from the "don't care" logic to the address lines X and $\bar{X}$ connected to address decoders of the memory state register and of the base address status register.

In this case, the "don't care" logic includes a cascade arrangement of NOR-NAND gates which connect the outputs of the shift register with the outputs of a preceding cascade stage, those of the $n$ outputs of the "don't care" logic which have a lower value than the indicator input of the shift register being set to logic 1, while the indictor input and all outputs of higher value than the indicator input are set to logic 0 as don't care states, and the output of the last cascade stage being connected to the control mechanism in order to indicate the end of a group processing step.

The contents of the limit value register are compared in a comparator with the indicator position of the shift register and if coincidence is attained, a control signal is emitted to the control mechanism so that the shifting direction of the shift register is reversed.

The exclusive-OR circuit for each of the $n$ binary bits includes a NAND gate circuit for the exclusive-OR function which produces a first signal EOR(i) = MAR(i) + SPR(i) (herein + and . represent logic OR and AND, respectively) at the output of the last NAND gate and simultaneously a second signal $\overline{MAR(i) \cdot SPR(i)}$ at the output of the first NAND gate, an inverter connected directly in series with the first NAND gate which complements the second signal into a signal MAR(i) . SPR(i) and a protective diode which switches each of the outputs of the $n$ inverters to a collecting bus.

Each one of the signal inputs for the signals EOR(i) and D(i) of the addressing logic is brought to two NOR gates, the input for the signals EOR(i) being connected to the one of NOR gates via an inverter and both NOR gates being logically linked via inverters in a NAND logic with the signal of the input of DATABUS(i); a writing signal WRT or $\overline{WRT}$ controlling the outputs X(i) and $\bar{X}(i)$ in a predetermined manner.

The advantages obtained with the present invention are, in particular, that a substantial simplification of the operating system is obtained, that the process of memory monitoring takes place in parallel with the normal program of the central unit and substantially independently thereof, and that valuable computer time and working memory capacity is saved.

One embodiment of the invention is illustrated in the drawings and will be described in detail below.

DESCRIPTION OF THE PREFERRED EMBODIMENT

Figure 1:
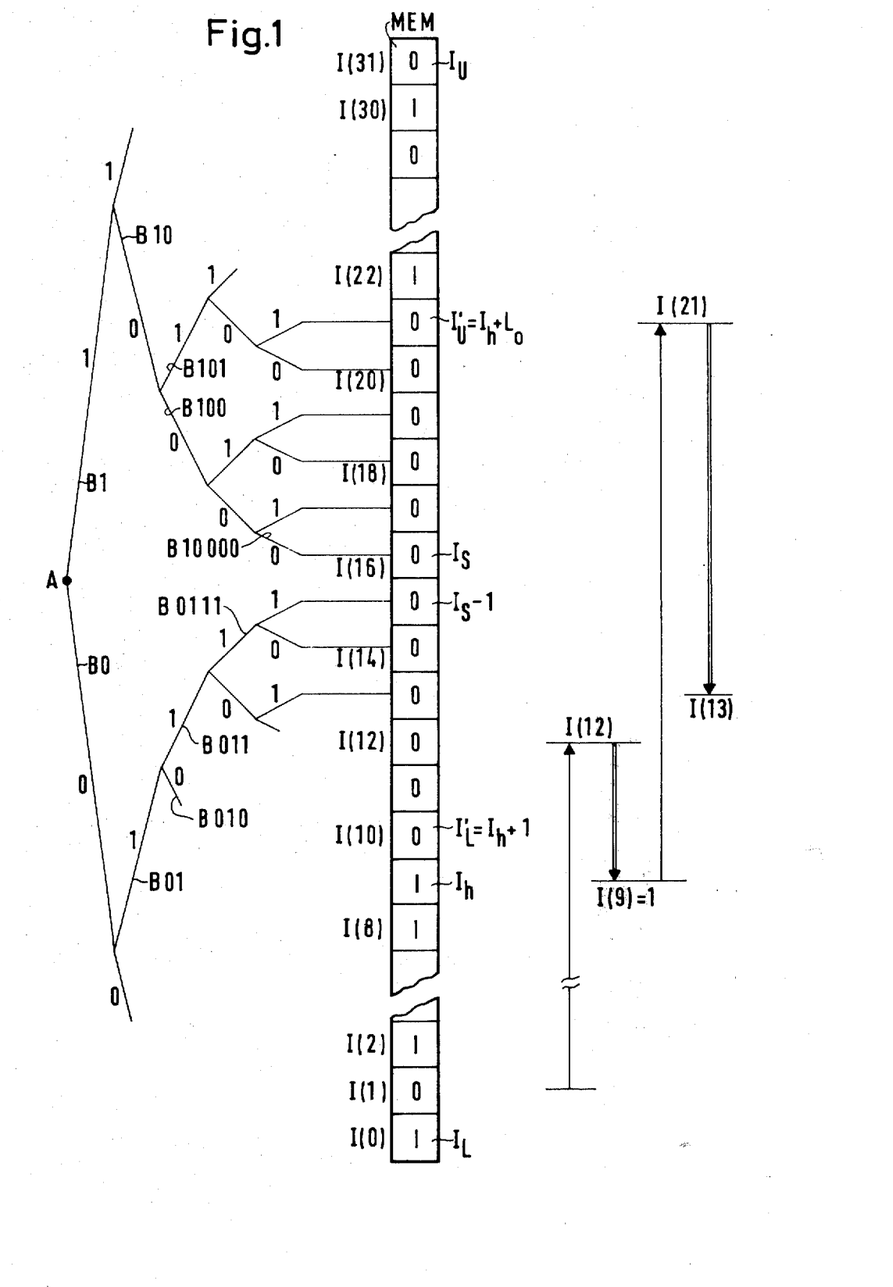
FIG. 1 is a schematic representation of the memory state register MEM of the memory monitoring unit, with organization and interrogation scheme, of a preferred embodiment of the invention.

FIG. 1 illustrates schematically a memory state register MEM with an organization and interrogation scheme. It represents $N = 2^n = 2^5 = 32$ unoccupied and occupied locations of the working memory having the addresses I (O to N−1) and is to be searched, for example, for a contiguous sequence of twelve unoccupied memory locations. A logic 0 in a register bit stage corresponds to an unoccupied working memory location and a logic 1 in a register bit stage corresponds to an occupied working memory location. Thus, it is possible, for purposes of the present discussion, to refer interchangeably to memory locations and register status. In the first group which includes the memory location corresponding to stages 1 through 12, the register MEM is searched downwardly starting with stage 12. Register stage 9, however, is occupied, $I(9) = 1$ so that the search through descending addresses, or stages, is interrupted at this point. After a forward jump over twelve locations to address I(21) which is the uppermost address of the next group to be interrogated, the scanning begins there anew. The search process ends at $I_L(13)$, the lowermost address of the group. The nine memory locations of the second group together with the three memory locations of the first group produce the desired sequence of twelve unoccupied, adjacent memory locations. The highest address of an occupied memory location preceding this sequence is $I_h = I(9)$, the base address of the desired sequence of memory locations is $I'_L = I_h + 1 = I(10)$.

A further significant reduction in the number of testing steps to locate a predetermined sequence of empty memory locations is achieved by block-wise addressing of the register MEM by don't care states which are fed together with address I into an address decoding logic for the memory state register MEM. The principle of addressing with don't care states is that one on a plurality of binary locations in a given address code be logically interpreted as 0 or as 1. Thus all addresses which can be distinguished only with respect to these binary locations — which have been identified by the don't care states — are activated simultaneously. In the example of a memory state register MEM shown in FIG. 1, for example, for

| | | | |
|---|---|---|---|
| $n = 5$ | I(3) | : | 00011 |

| | | | |
|---|---|---|---|
| and | I(19) | : | 10011 |

Addresses I(3) and I(19) differ only in the logic state of their most significant, or highest, bit $n$. If this bit is interpreted as a don't care bit and thus remains unconsidered in both addresses, both addresses can be activated simultaneously.

FIG. 1 provides a scheme for the $2^5 = 32$ memory locations and their addresses in the binary code in that beginning with a point A downwardly directed branches are to be interpreted with logic 0 and upwardly directed branches with logic 1. When going through this scheme from point A to one of the $2^n$ memory locations, changing bit value only after the highest order bit, this interpretation results in the binary. coded address I for the memory location, e.g., memory location 16 I(16) : 1 0000 or memory location 15 I(15) : 0 1111

This scheme indicates that the memory locations in:
blocks B0 (0 to 15) and B1 (16 to 31);
and subblocks B00 (0 to 7), B01 (8 to 15), B10 (16 to 23), B11 (24 to 31);
and B000 (0 to 3), B001 (4 to 7), B010 (8 to 11), B011 (12 to 15), B100 (16 to 19), B101 (20 to 23), B110 (24 to 27), B111 (28 to 31);
etc., can be addressed by the insertion of the don't care bits $d$ at appropriate locations.

The binary code of an address I is $I(n-1 : 0)$; D $(n-1 : 0)$ is any one of $2^n = N$ possible don't care states.

In order to carry out such an addressing scheme, each of the registers MEM and BAS can be associated with a conventional address decoder for three-bit addresses. The basic structure of such a decoder is described in the text: Hellermann, DIGITAL COMPUTER SYSTEM PRINCIPLES, pages 196–7, McGraw-Hill (1967). The decoder disclosed therein is provided with two sets of two input lines, while decoders employed in embodiments of the present invention will be provided with two sets of three vertical input lines X(0), X̂(0); X(1), X̂(1); X(2), X̂(2) associated with three address bits. Therefore, while the decoder disclosed in the above-cited publication includes four AND gates, the address decoder required in systems according to the present invention will of necessity contain eight such gates. The exact linkage between the six input lines and the eight gates can be derived in a simple and straightforward manner by extrapolation of the pattern disclosed in the Hellermann publication. All that is required is that each gate be connected to respond to a different combination of address bit values.

The binary code of an $n$ bit address I may be denoted $I(n-1:0)$, and $D(n-1:0)$ may denote a bit pattern in which all don't care states of the address codes $I(n-1:0)$ are indicated by a 1. All other bit positions of the address are indicated by a 0.

If $X(n-1:0)$ and $X̂(n-1:0)$ are the sets of address lines to the decoder, then the address code $I(n-1:0)$ and the don't care code $D(n-1:0)$ must be furnished to the address lines in the form $$\left.\begin{array}{l}X(i) = \overline{I(i)} \vee D(i) \\ \hat{X}(i) = I(i) \vee D(i)\end{array}\right\}n-1>i>0$$

where V represents the disjunctive (OR) relation. In the absence of don't care conditions, i.e. $D(i) = 0$ for all $i$, an individual cell MEM(I) is addressed.

The data collecting buses $X(i)$ and $\hat{X}(i)$ are connected with the address decoder in the usual manner so that in the absence of don't care conditions, $D(i) = 0$ for all (i)s, an individual cell MEM(I) is addressed.

If D is as follows:

$$D_k = D(i) = \begin{cases} 0 \text{ for } n-1 \geq i \geq k \\ 1 \text{ for } k-1 \geq i \geq 0 \end{cases} \quad (2)$$

where $k$ is a bit of predetermined value of $n$ possible bits — then there exists a block of $2^k$ continuous addresses within limits $I_A$ and $I_E$, whose binary codes are given by the equations $$I_A(i) = \begin{cases} I(i) \text{ for } n-1 \geq i \geq k \\ 0 \quad \text{ for } k-1 \geq i \geq 0 \end{cases}$$

$$I_E(i) = \begin{cases} I(i) \text{ for } n-1 \geq i \geq k \\ 1 \quad \text{ for } k-1 \geq i \geq 0 \end{cases} \quad (3)$$

which can be activated simultaneously.

In order to be able to utilize this method of blockwise addressing for the algorithm for locating sequences of unoccupied memory locations, any desired group MEM ($I_L : I_U$) must be divided into such blocks and a strategy must be developed for their stepwise interrogation.

If g is the highest order bit in which the binary codes of $I_L$ and $I_U$ can be distinguished, e.g. $I_L (n-1 : g+1) = I_U (n-1 : g+1)$, but $I_U(g) = 1$; $I_L(g) = 0$, then g defines a group address $I_S$ of the binary form $$I_S(i) = \begin{cases} I_u(i) \text{ for } n-1 \geq i \geq g \\ 0 \quad\quad g-1 \geq i \geq 0 \end{cases} \quad (4)$$

with the following features:

$I_S$ divides the memory state register MEM ($I_L : I_U$) into a lower group $S0 = $ MEM ($I_L : I_S - 1$) and an upper group $S1 = $ MEM ($I_S : I_U$). $I_S - 1$ and $I_S$ are upper and lower limits of two simultaneously addressable blocks $B0 = $ MEM ($I_S - 2^g : I_S - 1$) and $B1 = $ MEM ($I_S : I_S + 2^g - 1$), each block having the size $2^g$, i.e. containing $2^g$ locations.

Since $I_U \leq I_S + 2^g - 1$ and $I_L \geq I_S - 2^g$, the address $I_U$ and group S1 are included in block B1 and address $I_L$ and group S0 are included in block B0.

The blockwise addressing within the upper segment S1 or within the lower segment S0 of the memory state register MEM results from the following. If the address $I_U$ lies in the upper half B11 of Block 1, bit $I_U (g-1)$ has the address code logic value 1; otherwise it has the code logic value 0.

On the other hand, the condition $I_U (g-1) = 1$, indicates that the block B10 which is the lower half of block B1 is available for the blockwise interrogation, if $I_U$ is in B11, because B10 is completely contained in group S1. Block B10 can be reached via address $I_U$. In this case bit $I_U(g-1)$ must be interpreted as logic 0 and don't care states $D(i) = 1$ must be used for $g - 2 \geq i \geq 0$ (e.g., for all bits to the right of bit position $(g-1)$).

The condition $I_U (g-1) = 0$ indicates that in the upper group S1 no block of the size $2^{g-1}$ is present.

If the address $I_L$ lies in block B00 which is the lower half of block B0, then bit $I_L (g-1)$ is set to logic 0, so that the upper half B01 of block B0 is available for blockwise addressing in the lower group S0.

If the block must be addressed, $I_L (g-1)$ must be set to logic 1 with simultaneously setting the don't care states $D(i) = 1$ for $g - 2 \geq i \geq 0$.

The condition $I_L (g-1) = 1$ shows that in the lower group S0 a block of the size $2^{g-1}$ does not exist.

This scheme is used successively for all bits $g - 1 \geq i \geq 0$ of the addresses $I_U$ and $I_L$ and the entire block structure of the segment MEM ($I_U - 1 : I_L + 1$) is determined. $I_U - 1$ and $I_L + 1$ always lie below the upper limit $I_U$ or above the lower limit $I_L$, respectively, of a block. In order to properly include $I_U$ and $I_L$ in the block structure, addresses $I_U + 1$ and $I_L - 1$ must be examined.

Figure 2:
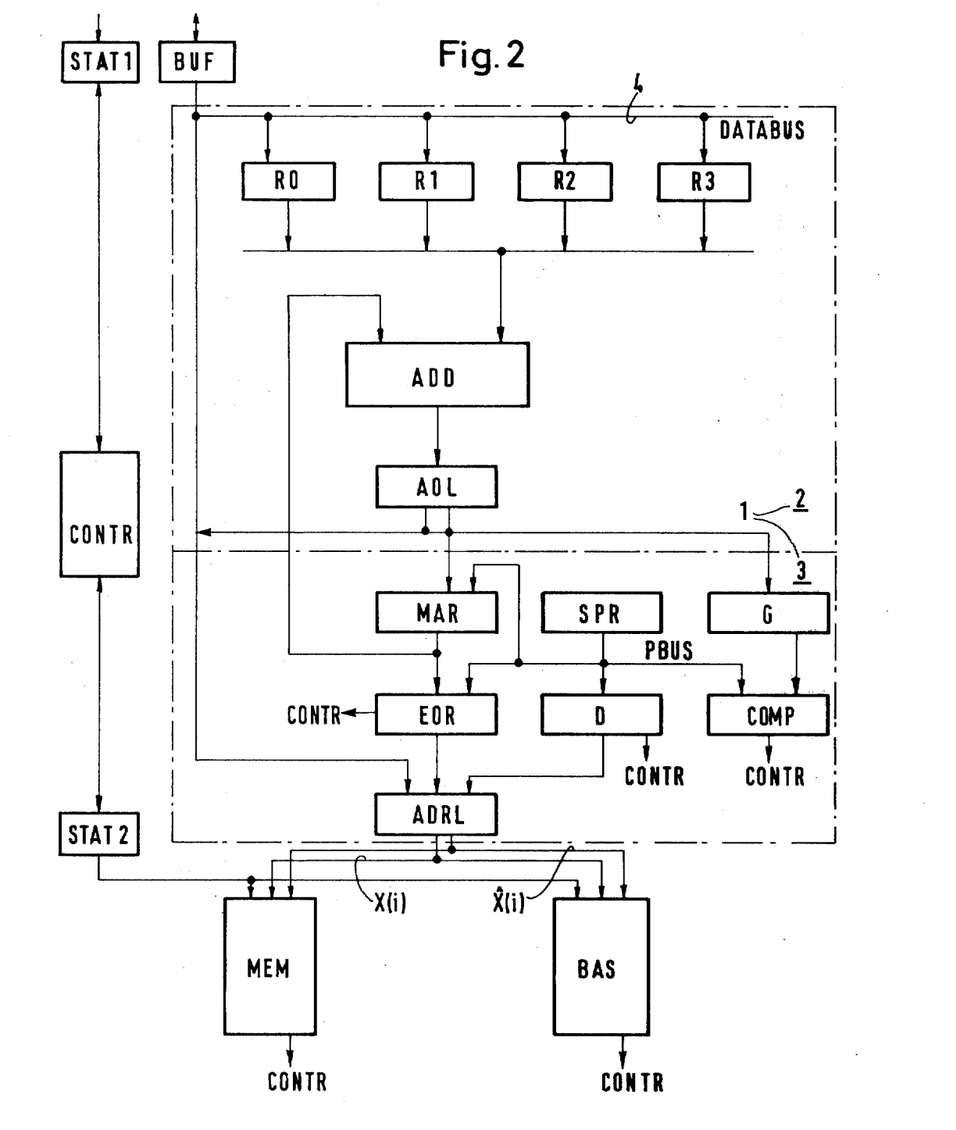
FIG. 2 is a block circuit diagram of the memory monitoring unit MMU of the same embodiment.

The block circuit diagram of an embodiment of the memory monitoring unit (MMU) which operates according to the principle described above with reference to FIG. 1 is shown in FIG. 2. The memory monitoring unit includes an arithmetic-logic function unit 1 and data gathering cables each designed to conduct $n$ bits, $n$ being determined by the working memory capacity of $2^n$ addressable memory locations.

The control mechanism CONTR performs, in dependence on the states of the status flip-flops STAT1, one of the modes SEARCH, ERASE, ERBAS, or WRITE, or passes through a waiting loop.

The SEARCH mode processes a memory location request by simultaneous searching of the memory state register MEM and the base address status register BAS for a group of given length which carries only 0s; the ERASE mode processes a memory location return by returning to 0 a given group of locations in MEM which is continuously occupied with 1s. The ERBAS mode searches the base addresses left after the return of a group of memory locations, marked by a 1 in the corresponding stage, or bit location, of BAS, and causes the release of the corresponding memory group. The WRITE mode marks the base addresses by writing a 1 in the corresponding stage of BAS.

A basic feature of the memory monitoring unit according to the present invention is that it is arranged to provide representations of information identifying the status of the working memory locations by a "marking" scheme. The memory monitoring unit is provided with a 1 bit per stage direct access memory MEM, which provides storage in a single bit plane and which is provided with its own address decoder that associates each bit location of the register with a respective addressable location of the working memory, the register stage and respective working memory location having a common address I. The register stage MEM(I) is in the 1 state if the corresponding working memory location is occupied and in the 0 state if that location is unoccupied.

Thus, the problem of monitoring and managing the working memory is reduced to the following elemental operations: if a group of L contiguous working memory locations is requested, then the register MEM must simply be searched for a contiguous string of L stages each containing a 0 bit. If such a string is found, these stages are set to the 1 state and then the lowest address of this string is transmitted to constitute a base address. Correspondingly, if storage space in the working memory is to be released, the associated string of stages in register MEM, which must be identified to the memory monitoring unit by a base address and a string length, are all set to the 0 state. Thus, in order to execute this particular search technique, the "first bit" method is preferred over the "best bit" method.

This marking scheme, however, requires that special treatment be given to base addresses which represent a specific type of information. On the one hand, such base addresses are required to access programs and data in their actual working memory locations and, on the other hand, they simply represent the memory region they point to at another location. It is in order to satisfy these two requirements that the memory monitoring unit is provided with the base address status register BAS(0:N−1) which identifies all locations of the working memory that contain a base address by the provision of the binary 1 value in the corresponding stage of this base address status register.

It thus follows that to prevent the disappearance of base addresses from the working memory, both of the registers MEM and BAS must be searched simultaneously for a suitable string of conditions represented by a binary 0 value in the corresponding stages of both registers, if storage space is requested. Before a base address is transferred to the computer processing unit, the marking within this string must be changed to binary 1 values in register MEM and binary 0 values in register BAS. Whenever a base address is stored within the corresponding group of working memory locations, then a binary 1 value must be present in the corresponding MEM register stage and a binary 1 must be present in the corresponding BAS register stage.

The memory monitoring unit according to the present invention accepts instructions from the computer central processing unit and thereafter operates independently, and concurrently to other central processing unit activity. The only data to be returned to the central processing unit are base addresses following the processing of storage requests. Occasionally, the computer working memory needs to be accessed to obtain a left-over base address and the associated string length when processing relates to a MEM register stage containing a binary 0 value and a corresponding BAS stage containing a binary 1 value. This, however, is done by way of cycle-stealing from the computer central processing unit, without an interrupt.

As has been mentioned above, the memory monitoring unit operates according to four different algorithms: SEARCH, ERASE, ERBAS and WRITE. The SEARCH algorithm can only be initiated by an instruction from the computer central processing unit. The ERASE algorithm releases storage space conditionally upon receipt of an instruction from the computer central processing unit or upon internal activation. The ERBAS algorithm is only initiated internally to effect a search for left-over base addresses, i.e., a condition represented by a binary 0 value in a stage of register MEM and a binary 1 value in the corresponding stage of register BAS. These three algorithms are effectuated by internal microprograms in the memory monitoring unit.

On the other hand, the WRITE algorithm is controlled completely by the computer central processing unit. Its function is to mark the location of base addresses in the computer working memory in the corresponding stages of the register BAS. This is done by cycle-stealing from the memory monitoring unit whenever a base address is stored.

The basic algorithm controlling conditions to be observed by the memory monitoring unit are stored in first and second status flip-flops. The first flip-flop is set to the binary 1 state if the computer central processing unit requests some operation by the memory monitoring unit. The second flip-flop BLO is set to the binary 1 internally, if the memory monitoring unit has an instruction which is to be executed internally.

When in its idling state, the memory monitoring unit continuously tests the contents of the first and second flip-flops. If the first flip-flop is set to its binary 1 state, the memory monitoring unit requests an instruction from the computer central processing unit, which instruction identifies either a SEARCH or ERASE algorithm, followed by information relating to a string length or to a base address and a string length, respectively. The SEARCH algorithm terminates with the delivery, to the computer central processing unit, of either a base address or a signal indicating that no group of memory locations of the requested length is available. The ERASE algorithm terminates by setting the second flip-flop to its binary 1 state, based on the assumption that the released string of memory locations may contain base addresses, i.e., the registers MEM and BAS may contain the binary values 0 and 1, respectively, in corresponding stages, left over for further processing.

Both the SEARCH and ERASE algorithms reset the first flip-flop to its binary 0 state immediately after receiving the respective instructions so that the computer central processing unit can make a reservation for further service.

If the memory monitoring unit enters its idle loop after termination of a SEARCH or ERASE algorithm, and the first flip-flop is set to its binary 0 state while the second flip-flop is set to its binary 1 state, then the ERBAS algorithm is triggered. This algorithm causes the registers MEM and BAS to be searched for a working memory location for which the corresponding stage of register MEM is in its binary 0 state and the corresponding stage of register BAS is in its binary 1 state. If this occurs for a group of memory locations, the location with the highest address $I_{max}$ is marked and the corresponding stage $BAS(I_{max})$ is set to its binary 0. Thereafter, the ERASE algorithm is initiated using the address $I_{max}$ to access the corresponding location of the computer working memory and the working memory locations indicated by the address in the first-mentioned working memory location, by way of cycle-stealing from the computer central processing unit. The contents of these working memory locations are interpreted as base address and string length, respectively, of memory locations that are not to be released.

If, during execution of the ERBAS algorithm, the condition indicating the presence of a base address in a working memory location does not occur, then no base addresses are left over, the second flip-flop is reset to its binary 0 state, and the memory monitoring unit again enters its idle loop.

Hence, the algorithms ERASE and ERBAS alternate until the state is reached at which the second flip-flop is in its binary 0 state, unless the cycle is interrupted by a request of higher priority from the computer central processing unit.

The algorithms SEARCH, ERBAS and ERASE involve a fast string search which interrogates and, if necessary, modifies the contents of entire blocks of stages in registers MEM and/or BAS simultaneously.

The arithmetic-logic function unit 1 carries out the appropriate microprograms.

Data about the state of the memory locations are stored in two 1-bit per stage direct access memories, constituted by the memory state register MEM and the base register BAS, whose mode of operation (writing in/reading out) is determined by the status flip-flops STAT2 which are set by the control mechanism CONTR.

The control mechanism CONTR can be constituted by ring counters as well as by a read-only microprogram memory. It operates in alternation with the status flip-flops STAT1 through which the control information is exchanged with a central processing unit (CPU) and internal control information is stored. Therefore, the status flip-flops STAT1 are grouped into a first group set by the central processing unit and interrogated by the memory monitoring unit (MMU), a second group which is set by MMU and interrogated by CPU and a third group which is set as well as interrogated by MMU.

Following is a list of all status flip-flops STAT1 and their functions:

a. STAT1 which can be interrogated by CPU:
  BSY (busy); the MMU is presently carrying out a microprogram which can be interrupted only by a WRITE mode.
  RTO (MMU ready for data takeover); MMU is in a state in which data or instructions are requested from CPU.
  RDB (MMU ready to deliver base address); MMU is in the state of a completed SEARCH mode and has a base address for CPU.
  MCS (memory cycle stealing); MMU requires access to a working memory.
  SNF (string not found); a memory group of the required length is not available.
b. STAT1 which can be interrogated by MMU:
  CPU CPU has an instruction for MMU.
  SRH the microprogram SEARCH has been activated.
  ERA the microprogram (MP) ERASE has been activated.
  ERB the MP ERBAS has been activated.
  WRT the WRITE mode "steals" from MMU a cycle for setting BAS.
  BLO (base address left over); the processing of at least one base address remaining from the release of a segment is to be carried out.
Of these status flip-flops
  WRT is set and reset by CPU;
  CPU and SRH are set by CPU and reset by MMU;
  ERB and BLO are set and reset by MMU;
  ERA is set either by CPU or by MMU; but reset only by MMU.

Via a second group of status flip-flops (STAT2) the control mechanism sets off the memories MEM and BAS required for the respective mode, which remains in effect for the duration of the mode.

The functions of these status flip-flops are as follows:
  MMA (MEM access); the memory MEM is addressed in the read-out mode;
  BSA (BAS access); the memory BAS is addressed in the read-out mode;
  MMW (MEM write); if MMA is set, MEM is written into;
  BSW (BAS write); if BSA is set, BAS is written into.

In order to control the microprogram sequence, the control mechanism CONTR also receives a series of signals from the arithmetic-logic unit 1 which signals identify diverse register states and serve to conditionally branch out the microprograms.

The arithmetic-logic function unit 1 is functionally divided into an adder circuit 2 in which all arithmetic operations are carried out to prepare the algorithm for searching for one or more series of unoccupied memory locations (string search algorithms), as well as an indicator circuit 3 which takes over the performance of the string search algorithm, i.e., in particular the blockwise addressing of the registers MEM and BAS. The point of interconnection between the adder circuit 2 and the indicator circuit 3 is the memory address register MAR.

The adder circuit 2 includes a logic adder ADD, general registers R0, R1, R2, R3, whose contents are fed to the right-hand input of the adder, an adder buffer register AOL (adder output latches), and the address register MAR functioning as the accumulator. The contents of MAR may be fed directly to the left input of the adder ADD. Registers R0, R1, R2, R3 are written into via the data bus 4 either from the buffer register BUF or from the adder buffer register AOL.

From the contents of the memory address register MAR the indicator circuit 3 produces, with the aid of the indicator present in shift register SPR, the addresses which become effective in memory registers MEM or BAS, respectively, and automatically carries out the scanning of the data blocks.

The contents of shift register SPR are simultaneously fed via the data bus PBUS to register MAR as well as to the logic networks EOR, D, and COMP. According to the given string search algorithm, the indicator position $SPR_k$ is used to set bit MAR(k) in the ERBAS mode either to logic 1 or logic 0 as required. The indicator position $SPR_k$ is further used with the don't care logic D to product the don't care states $D_k$ to identify the state $D = 0$; i.e. the indicator position $k = 0$, and to feed this information to the control mechanism CONTR in order to indicate the completion of a memory location group interrogation. It is further used, via the logic network EOR, to logically invert the address bit MAR(k) and simultaneously to read out, via EOR, the contents of MAR with the bit coincident with the indicator position and to transfer it to the control mechanism CONTR for evaluation; and to effect a comparison in the comparator COMP of the indicator position $SPR_k$ with the contents of the limit value register G in which the bit $g$ which separates the two grups S1 and S0 of memory locations is stored, as well as to send a corresponding control signal to the control mechanism CONTR.

To be able, in an extreme case, to cover the entire address area with don't care states, as it becomes necessary, for example, at the beginning of the ERBAS mode in order to determine whether a remaining base address exists, the shift register SPR as well as the data bus PBUS between SPR and the logic network D must be laid out for $n + 1$ bits, i.e., SPR (0:$n$) and PBUS (0:$n$).

According to equation (1) above, the addressing logic ADRL produces, from the signal patterns produced by the logic networks EOR and D, the signals which are to be fed to the address lines X and X̂ in the respective address decoders of memories MEM and BAS. In lines X(i) the address bits (MAR(i)⊕SPR(i)) are linked with the don't care states D(i) and in lines X̂(i) and the inverted address bits ($\overline{MAR(i) \oplus SPR(i)}$) are OR-linked with D(i).

If the WRITE mode is present (i.e. WRT=1) the abovementioned address is blocked and instead the data bus 4 is switched through to X and X̂ in the form of X(i) ← DATABUS(i), X̂(i) ← $\overline{DATABUS(i)}$ so that a base address emitted by CPU via the I/O buffer BUF can be marked directly in the memory register BAS.

Figure 3:
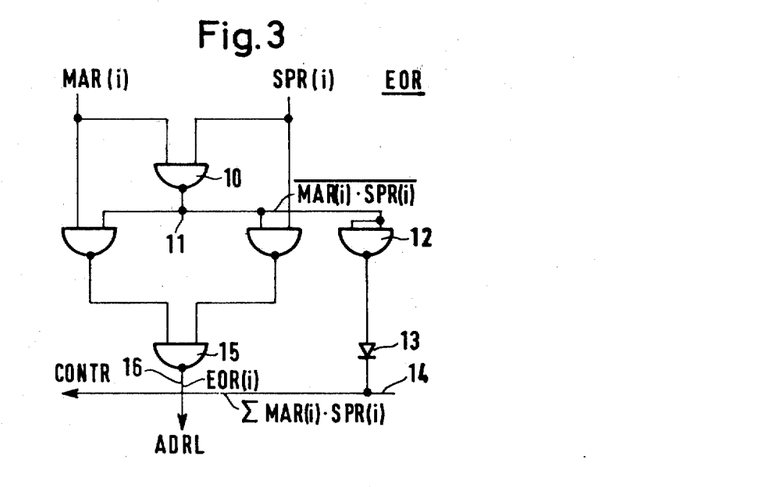
FIG. 3 shows a logic network EOR of the circuit of FIG. 2, in which the bit of an address which coincides with the indicator position is inverted and can be read out simultaneously.

The exclusive OR circuit EOR shown in FIG. 3 effects the inversion of bit $k$ of that MAR address register which coincides with the indicator position $k$, such inversion being required for the string search algorithm. At the same time the contents of MAR(k) are fed to the control mechanism CONTR as BRANCH condition which decides whether position $k$ requires access to the memory register or can be skipped without action.

Both functions are realized, according to FIG. 3, by a NAND gate circuit for the exclusive-OR function, which simultaneously produces, on a line 16 at the output of a NAND gate 15, EOR(i) = MAR(i)⊕SPR(i) and — at the output 11 of the first NAND gate (10) — a signal $\overline{MAR(i) \cdot SPR(i)}$; the latter is complemented by an immediately following inverter 12 to MAR(i).SPR(i). Such a circuit exists for every binary location $i$.

If the indicator is in position $i = k$, then, according to the definition of the contents of shift register SPR, the output EOR(k) = $\overline{MAR(k)}$, but for all $i \neq k$ EOR(i) = MAR(i). All outputs EOR(i) are fed to the addressing logic ADRL.

The signals MAR(i).SPR(i) for all binary locations $i$ are combined, via a protective diode 13, in a bus 14 and are there logically summed to $$\sum_{i=0}^{n-1}$$

MAR(i).SPR(i). Since only SPR(k)=1, exactly the signal MAR(k) is present on the bus and that signal is then fed to the control mechanism CONTR for interpretation.

Figure 4:
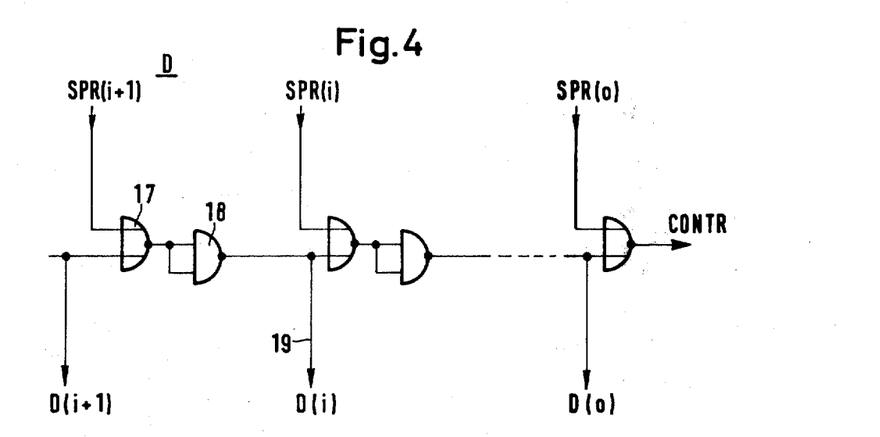
FIG. 4 shows a logic network D of the circuit of FIG. 2 for producing don't care states.

The don't care logic D shown in FIG. 4 produces from the indicator location $k$ of shift register SPR the don't care states required for addressing the blocks which are fed to the addressing logic ADRL together with the outputs of EOR. According to the definition of equation (2), all D(i) to the right of indicator location $k$ must carry a logic 1 signal while D(k) itself, and all D(i) to the left of D(k), carry a logic 0. This is accomplished by a cascade of NOR-NAND gates 17-18 which combine the outputs of shift register SPR(i) with the outputs of the preceding cascade stages. Thus the outputs of all cascade stages following stage $k$ carry logic 1, and all the preceding cascade stage outputs carry logic 0. Thus the D(i) can be obtained directly from the outputs of the cascade stages.

The output of the last cascade member is logic 0 if an indicator position SPR(k)=1 exists, but logic 1 if the indicator shifts toward the left ($k > n-1$) or to the right ($k < 0$) out of SPR. The latter case, which is the only case that will occur during proper operation of the memory monitoring unit MMU, indicates the end of a group processing phase (see algorithm) which is the reason why the last cascade output is connected to control mechanism CONTR.

Referring again to indicator circuit 3 of FIG. 2, the comparison circuit COMP includes a NAND logic and determines whether the indicator bit position SPR$_k$ coincides with the contents of register G. For this purpose the EOR terms SPR(i)⊕G(i) are formed for all $0 \leq i \leq n-1$ and are logically summed on a bus. Since, by definition, SPR and G each contains exactly one bit at logic value 1, The bus is set to logic 0 only for the case where SPR(k)=G(k), in all other cases it is logic 1. The bit position SPR(k)=G(k) effects, in the control mechanism, reversal of the direction of shifting of the indicator.

Figure 5:
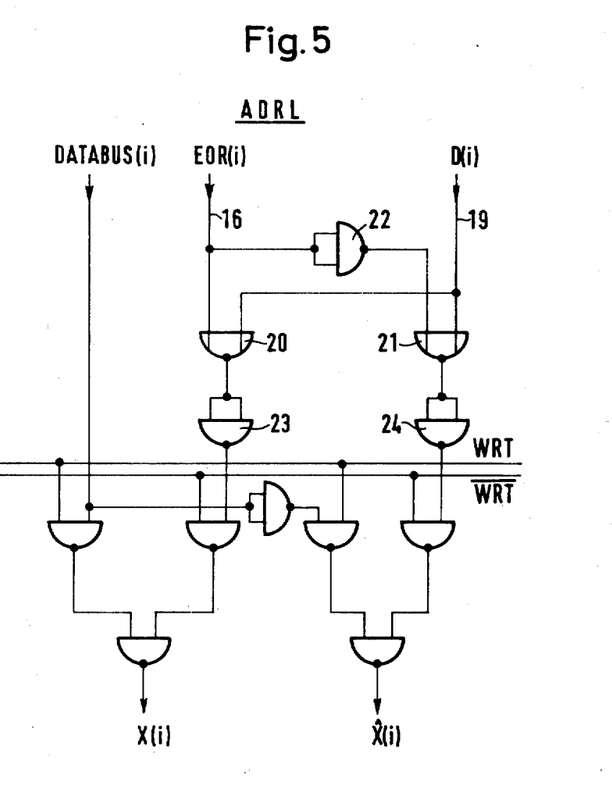
FIG. 5 shows an addressing logic ADRL of the circuit of FIG. 2.

The addressing logic ADRL, one embodiment of which is shown in FIG. 5, links the effective address $I_{eff}$=MAR⊕SPR according to equation (1) with the don't care states D and connects the respective address decoders of memories MEM and BAS to the address lines X, X̂. For the WRITE mode it is also possible to quickly feed a base address furnished by CPU into X and X̂ with simultaneous blocking of the address produced by EOR and D.

The addressing logic ADLR carries out the following logic linkages:

$$X(i) = WRT \cdot DATABUS(i) + \overline{WRT} \cdot (EOR(i)) + D(i)$$

$$\hat{X}(i) = WRT \cdot \overline{DATABUS(i)} + \overline{WRT} \cdot \overline{(EOR(i))} + D(i)$$

i.e., with WRT (furnished by the corresponding STATUS flip-flop) the DATABUS is switched through to X, X̂, and with $\overline{WRT}$, i.e., for every other mode of the memory monitoring unit MMU, the address is formed according to equation (1).

The embodiment shown in FIG. 5 constitutes one stage of an ADRL having an input line 16 from the EOR(L) stage of FIG. 3 and an input line 19 from the D(i) stage of the unit D shown in FIG. 4. Line 16 is connected to one input of a NOR gate 20 and to an inverter 22 whose output is connected to one input of a NOR gate 21. Line 19 is connected to the second input of each of gates 20 and 21. Each of gates 20 and 21 has its output connected to the input of a respective one of inverters 23 and 24. A further logic unit is connected to the outputs of gates 23 and 24, lines WRT and $\overline{WRT}$ and the output line DATABUS(i) and links the signals on these lines according to the logic relations set forth above to produce signals X(i) and X̂(i).

It will be understood that the above description of the present invention is susceptible to various modifications, changes and adaptations, and the same are intended to be comprehended within the meaning and range of equivalents of the appended claims.

What is claimed is:

1. In a system for monitoring the working memory of a computer equipped with a processing unit in order to locate, upon request by a program being carried out in the computer and under control of respective algorithms, a group of L contiguous unoccupied memory locations, mark such locations as occupied and make them available for use by such requesting program, and in order to release a previously occupied group of memory locations no longer needed by such program and mark such locations as unoccupied, and in order to specially treat those working memory locations which contain base addresses, constituting pointers to other groups of working memory locations, the improvement comprising:

means including a 1-bit direct access memory state register and a 1-bit direct access base address status register, each register containing an address decoder and having a plurality of single bit stages, with each stage corresponding to a respective location of the working memory, means for connecting said memory state register to the working memory for setting each stage of said memory state register to one binary state when its corresponding working memory location is occupied and to the opposite binary state when its corresponding working memory location is unoccupied, and means for connecting said base address status register to the working memory for setting each stage of said base address status register to the one binary state when its corresponding working memory location is occupied by a base address and to the opposite binary state when its corresponding working memory location is not occupied by a base address;

a first group of status flip-flops arranged to provide signals indicating the algorithm to be executed by said system and arranged to be set by, and interrogated by, the computer processing unit;

a second group of status flip-flops connected to control inputs of said state register and said status register and providing signals indicating which of said state register and status register is to be subjected to an operation;

arithmetic-logic function unit means including an adder circuit and an indicator circuit connected to said state register and said status register, said indicator circuit including a forward-backward shift register, a memory address register having inputs connected to said adder circuit and to the output of said shift register, an addressing logic having pairs of outputs connected to the address decoders of said memory state register and said base address status register for transmitting address signals thereto, each pair of outputs being associated with a respective address bit position; means connecting the outputs of said shift register and said memory address register to an input of said addressing logic, and a don't care logic having an input connected to the output of said shift register and an output connected to an input of said addressing logic and arranged to produce don't care address bits for addressing blocks of stages in said memory state register and said base address status register;

said indicator circuit including means for producing, at each pair of outputs of said addressing logic: a binary 1 value on a first line of the pair and a binary 0 value on a second line of the pair when the corresponding address bit has a binary 1 value; a binary 0 value on the first line of the pair and a binary 1 value on the second line of the pair when the corresponding address bit has a binary 0 value; and a binary 1 value on both lines of the pair when a don't care address bit is being produced by said don't care logic at the respective address bit position, in order to subdivide a group of contiguous working memory locations into simultaneously addressable blocks and to scan the locations of each block sequentially, from the location having the highest address, in the direction of descending addresses; and a control mechanism connected to said first and second groups of status flip-flops and to said function unit means for setting said status flip-flops, under control of signals from said function unit means and the computer processing unit, in a manner to selectively perform any selected one of:

a first operating sequence in response to a corresponding instruction from the computer processing unit, for searching, starting from an aribtrarily selected memory location, both of said state register and status register simultaneously to locate in each of said state register and said status register a group of L contiguous register stages which are all in the opposite binary state, a second operating sequence, in response to a corresponding instruction from the computer processing unit, for setting, to the one binary state, each stage of said base address status register which corresponds to a working memory location containing a base address, a third operating sequence, in response to a corresponding instruction and signals indicating a particular base address and a given group length, for setting to the opposite binary state a number of stages of said memory state register corresponding to such length and starting from the stage corresponding to such base address, and a fourth operation sequence, in response to an instruction generated in said system, for searching both of said state register and said status register for the occurrence of the opposite binary state in a stage of said state register and the occurrence of the one binary state in the corresponding stage of said status register, indicating that the corresponding working memory location contains a base address, and, subsequent to locating such occurrence, setting such status register stage to the opposite binary state.

2. An arrangement as defined in claim 8 wherein said adder circuit comprises a logic adder having two inputs; a plurality of general registers having their outputs connected to a first one of said two inputs of said adder, and having their inputs connected to a data bus for receiving information from a buffer register; and an adder buffer register having an input connected to the output of said adder; and wherein said memory address register is connected to store a group of bits constituting a selected address I and has an output connected to the second one of said two inputs of said adder to permit the contents of said memory address register to be fed back to said adder.

3. An arrangement as defined in claim 2 wherein:
said forward-backward shift register produces an output whose value is in accordance with the relationship:

$$SPR_k = SPR(i) = \begin{matrix} 1 \text{ when } k = i \\ 0 \text{ when } k \neq i, \end{matrix}$$

where $i$ is any stage of the memory state and base address registers, and $k$ is a predetermined stage thereof; said indicator circuit further comprises:

an exclusive-OR circuit having one input connected to the output of said shift register;

a comparator having two inputs, one of which is connected to the output of said shift register; and a limit value register having an input connected to the output of said adder buffer register and an output connected to the second input of said comparator for producing a binary signal indicating the boundary between two groups of working memory locations, such signal being a binary 1 at a bit location corresponding to the location of the working memory location at which the highest order bit of the address differs in value from that of a next adjacent address; and said addressing logic has inputs connected to the outputs of said exclusive-OR circut and said don't care logic.

4. An arrangement as defined in claim 3 wherein said don't care logic and said forward-backward shift register are each constituted by a plurality of stages each corresponding to a respective bit position in the address for a stage of said memory state register, each said stage of said don't care logic comprises a NOR-NAND gate unit having one input connected to the output of a respective stage of said forward-backward shift register and a second input connected to the output of the immediately preceding stage of said don't care logic, such that the output of each stage of said don't care logic which corresponds to a bit position of lower value than $k$ presents a logic value 1 and the outputs of the remaining stages present a logic value 0, corresponding to a don't care state, and with the output of the last stage of said logic being connected to said control mechanism to provide a signal indicating the end of a group processing operation.

5. An arrangement as defined in claim 3 wherein said comparator has an output connected to said control mechanism and operates to compare the output signals from said shift register and said limit value register and upon the occurrence of coincidence between the signals at its inputs, delivers a control signal to said control mechanism for effecting reversal in the direction of shifting of said shift register.

6. An arrangement as defined in claim 3 wherein the output of said memory address register is connected to an input of said exclusive-OR circuit, said exclusive-OR circuit includes n stages, one for each bit position of a memory state register address, and each said stage comprises: a NAND-gate circuit composed of at least two NAND-gates, the last of which NAND-gates produces a signal representing the exclusive-OR linkage of the output signals from said memory address register and said shift register, and the first of which NAND-gates produces a signal representing the NAND-linkage of the output signals from said memory address register and said shift register; an inverter connected to the output of said first NAND-gate to produce an output signal representing the complement of the output signal from said first NAND-gate, and thus the AND linkage of the output signals from said memory address register and said shift register; a protective diode connected in series with the output of said inverter; and a signal gathering bus connected to said protective diodes of all of said stages of said exclusive-OR circuit.

7. An arrangement as defined in claim 6 wherein said addressing logic comprises a plurality of stages, and each said stage comprises: first and second NOR-gates each having one input connected to the output of a corresponding stage of said don't care logic and the second input of said first NOR-gate being connected to the output of a corresponding stage of said exclusive-OR circuit; a first inverter connected between the output of said corresponding stage of said exclusive-OR circuit and the second input of said second NOR-gate; a second inverter connected to the output of said first NOR-gate; a third inverter connected to the output of said second NOR-gate; means providing two write-in signals having mutually complementary binary values; and means defining a NAND-logic connected to logically link the output signals from said second and third inverters with the signal on the data bus and to have the delivery of address signals from said addressing logic controlled by the write-in signals.

* * * * *